(12) United States Patent
Whitney et al.

(10) Patent No.: US 11,392,682 B2
(45) Date of Patent: *Jul. 19, 2022

(54) IMAGE BASED PASSPHRASE FOR AUTHENTICATION

(71) Applicant: International Business Machines Corporation, Armonk, NY (US)

(72) Inventors: Michael J. Whitney, Cary, NC (US); Colm Nolan, Navan (IE); Mark Maresh, Wake, NC (US); Juan F. Vargas, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/130,070

(22) Filed: Dec. 22, 2020

(65) Prior Publication Data

US 2021/0110021 A1    Apr. 15, 2021

Related U.S. Application Data

(63) Continuation of application No. 16/004,947, filed on Jun. 11, 2018, now Pat. No. 10,885,176.

(51) Int. Cl.
*G06F 21/36* (2013.01)
*G06F 21/45* (2013.01)
(Continued)

(52) U.S. Cl.
CPC ............ *G06F 21/36* (2013.01); *G06F 21/45* (2013.01); *G06F 3/0482* (2013.01); *G06F 3/0484* (2013.01); *G06F 2221/2103* (2013.01)

(58) Field of Classification Search
CPC ................................ G06F 21/36; G06F 21/45
See application file for complete search history.

(56) References Cited

U.S. PATENT DOCUMENTS 7,376,899 B2   5/2008   Mäntyla
8,347,103 B2   1/2013   Jones et al.
(Continued)

FOREIGN PATENT DOCUMENTS

CN    102906776 A    1/2013
CN    104144052 A    11/2014
(Continued)

OTHER PUBLICATIONS

King, "Rebus Passwords", IEEE, pp. 239-243. (Year: 1991).*
(Continued)

*Primary Examiner* — William S Powers
(74) *Attorney, Agent, or Firm* — Cantor Colburn LLP; Tihon Poltavets

(57) ABSTRACT

Example techniques are described for image-based user authentication. An example method includes receiving, by a host system, a passphrase comprising a plurality of words, the passphrase being provided for authentication of a user. The method further includes generating, by the host system, an image selection grid comprising a plurality of images, each word from the passphrase corresponding to one or more images from the image selection grid. The method further includes receiving, by the host system, a plurality of selected images from the image selection grid. The method further includes storing, by the host system, the selected images as a login challenge for the user.

18 Claims, 9 Drawing Sheets

(51) Int. Cl.
  *G06F 3/0482* (2013.01)
  *G06F 3/0484* (2022.01)

(56) References Cited

U.S. PATENT DOCUMENTS

| | | |
|---|---|---|
| 8,881,251 B1 | 11/2014 | Hilger |
| 9,275,379 B2 | 3/2016 | Wallaja |
| 9,602,490 B2 | 3/2017 | Durham et al. |
| 9,633,048 B1 | 4/2017 | Dutta et al. |
| 10,678,896 B2 | 6/2020 | Kim et al. |
| 2004/0010721 A1* | 1/2004 | Kirovski ............... G06F 21/36 726/19 |
| 2004/0230843 A1 | 11/2004 | Jansen |
| 2007/0157099 A1* | 7/2007 | Haug ................... G06F 3/0486 715/779 |
| 2007/0157299 A1 | 7/2007 | Hare |
| 2007/0277224 A1 | 11/2007 | Osborn et al. |
| 2008/0244700 A1* | 10/2008 | Osborn ................ G06F 21/36 726/2 |
| 2008/0297589 A1* | 12/2008 | Kurtz .................... H04N 7/15 348/E7.083 |
| 2010/0169958 A1* | 7/2010 | Werner ................ G06F 21/36 726/19 |
| 2010/0235285 A1* | 9/2010 | Hoffberg ............. G06Q 20/308 705/37 |
| 2011/0078564 A1 | 3/2011 | Almodóvar Herráiz et al. |
| 2013/0340057 A1* | 12/2013 | Kitlyar .................. G06F 21/36 726/6 |
| 2014/0089243 A1* | 3/2014 | Oppenheimer .... G06K 7/10326 706/46 |
| 2014/0109208 A1 | 4/2014 | Song |
| 2015/0172274 A1 | 6/2015 | Camp |
| 2019/0377861 A1 | 12/2019 | Whitney et al. |

FOREIGN PATENT DOCUMENTS

| | | |
|---|---|---|
| CN | 106326327 A | 1/2017 |
| CN | 107113611 A | 8/2017 |

OTHER PUBLICATIONS

Authors et al., "Method for Secure Authentication using Passphrases," IP.com No. IPCOM000219560D, Jul. 5, 2012, 1-3.
List of IBM Patents or Patent Applications Treated as Related; Date Filed: Dec. 28, 2020, 2 pages.

* cited by examiner

IMAGE BASED PASSPHRASE FOR AUTHENTICATION

DOMESTIC PRIORITY

This application is a continuation of U.S. Non-Provisional Application Ser. No. 16/004,947, entitled "IMAGE BASED PASSPHRASE FOR AUTHENTICATION", filed Jun. 11, 2018, which is incorporated herein by reference in its entirety.

BACKGROUND

The present application generally relates to the field of computer security and particularly to user authentication using an image based passphrase.

Access to computer-based services, such as via the Internet, has become ubiquitous. For example, individuals utilize websites for multiple reasons. For certain transactions, such as secure transactions, secured access to the host site is desired to prevent unauthorized access. Typically, to access most computer services, the user must submit an alphanumeric password for authentication. The alphanumeric password system only works well if the user creates a lengthy, random, and unique password for each service he uses. But using this system effectively is very difficult for the user because it is difficult to create passwords that are both complex and easy to remember. Therefore, many users "cheat" by using easier and less secure passwords. Doing this creates vulnerability in the user authentication system. Thus, a security system is desired to prevent unauthorized access authentication and that is both secure and convenient to the user.

SUMMARY

According to one or more aspects of the technical solutions described herein, an example method for image-based user authentication includes receiving, by a host system, a passphrase comprising a plurality of words, the passphrase being provided for authentication of a user. The method further includes generating, by the host system, an image selection grid comprising a plurality of images, each word from the passphrase corresponding to one or more images from the image selection grid. The method further includes receiving, by the host system, a plurality of selected images from the image selection grid. The method further includes storing, by the host system, the selected images as a login challenge for the user.

Further, a system includes a memory, and a processor coupled with the memory. The processor performs an image-based user authentication that includes receiving a passphrase comprising a plurality of words, the passphrase being provided for authentication of a user. The image-based authentication further includes generating an image selection grid comprising a plurality of images, each word from the passphrase corresponding to one or more images from the image selection grid. The image-based authentication further includes receiving a plurality of selected images from the image selection grid. The image-based authentication further includes storing the selected images as a login challenge for the user.

Further, a computer program product includes a computer readable storage medium having program instructions embodied therewith, the program instructions executable by an electronic computer processor to perform an image-based user authentication. The image-based authentication includes receiving a passphrase comprising a plurality of words, the passphrase being provided for authentication of a user. The image-based authentication further includes generating an image selection grid comprising a plurality of images, each word from the passphrase corresponding to one or more images from the image selection grid. The image-based authentication further includes receiving a plurality of selected images from the image selection grid. The image-based authentication further includes storing the selected images as a login challenge for the user.

It is to be understood that the technical solutions are not limited in application to the details of construction and to the arrangements of the components set forth in the following description or illustrated in the drawings. The technical solutions are capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods, and systems for carrying out the several purposes of the presently described technical solutions.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
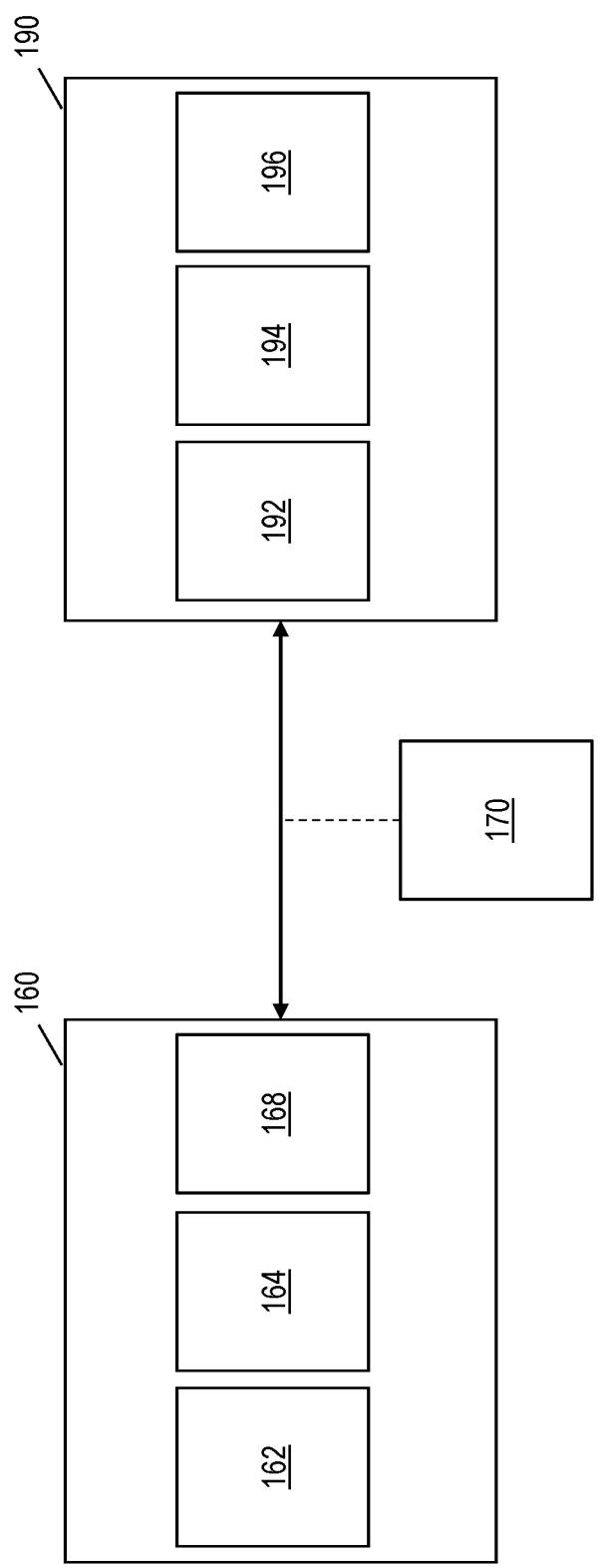
FIG. 1 illustrates a user authentication system according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Described herein are embodiments that facilitate preventing unauthorized access authentication and that is both secure and convenient to a user. The one or more embodiments facilitate securing access to a host site. As such the embodiments are rooted in and/or tied to computer technology in order to overcome a problem specifically arising in the realm of computers, specifically authenticating access by a user. As described in detail further, the technical solutions described herein facilitates a user to specify a phrase-oriented password (passphrase) which is converted to a series of images, which can be used for login and authentication for a host site. The technical solutions described herein provides a secure authentication because it includes randomization of passphrase-based images, insertion of a large set of random, related images, and allows for negative challenges. Users need to only remember a known passphrase to them and to be able to identify a series of images, which they may have reviewed, to secure access to the host site.

FIG. 1 illustrates a user authentication system according to one or more embodiments of the present invention. The user authentication system includes a user device 160 requesting authentication and access to information stored at a host system 190. The user device 160 may be any type of computing device capable of communicating with the host system 190 via a network. The user device 160 may be a desktop computer, a laptop mobile computer, a personal data assistant, a smartphone, or any other such communication device. The user device 160 includes a memory 164 and a processor 162 for controlling the operation of the user device 160. The user device 160 may also include a display 168 for displaying a user-interface. In one or more examples, the display 168 may be a touchscreen. The display 168, the processor 162, and the memory 164 are all in communication with each other. In one or more examples, the user device 160 is a mobile device such as a smartphone.

The host system 190 may be a remote system, such as a website, a computer program product, or any other such system that requires a password, a passphrase, or other security feature for access. The host system 190 includes a processor 196 and associated memory 192, which stores access codes 194 that are utilized to provide access to the host system 190. The access codes 194 may include images, metadata, user-credentials, and other types of data, which may be stored in a secure form, such as using encryption, and/or hashing. For example, the host system 190 may be server computer or any other communication device that hosts a website, or portal (such as desktop or mobile application) for accessing an account at a financial institution such as a bank, and the accessible features may include checking balances, transferring funds, depositing money, or paying bills.

Traditional, password based authentication methods have many user experiences and security disadvantages. New approaches are being developed to improve the user experience of system authentication, for example, biometrics, each with a set of advantages and disadvantages. The technical solutions described herein address the technical challenges with tradition password based authentication methods by facilitating users to login to the host system 190 securely using intuitive experiences, and using an easy-to-remember phrase (quotes, lyrics, poems), visual image recognition, and a touch (or click) interface. The technical solutions described herein facilitates the user to specify a phrase-oriented password which is converted to an image-based passphrase 170. The image based passphrase 170 is a series of images, which is used for system or service login and authentication for the host system 190.

Figure 2:
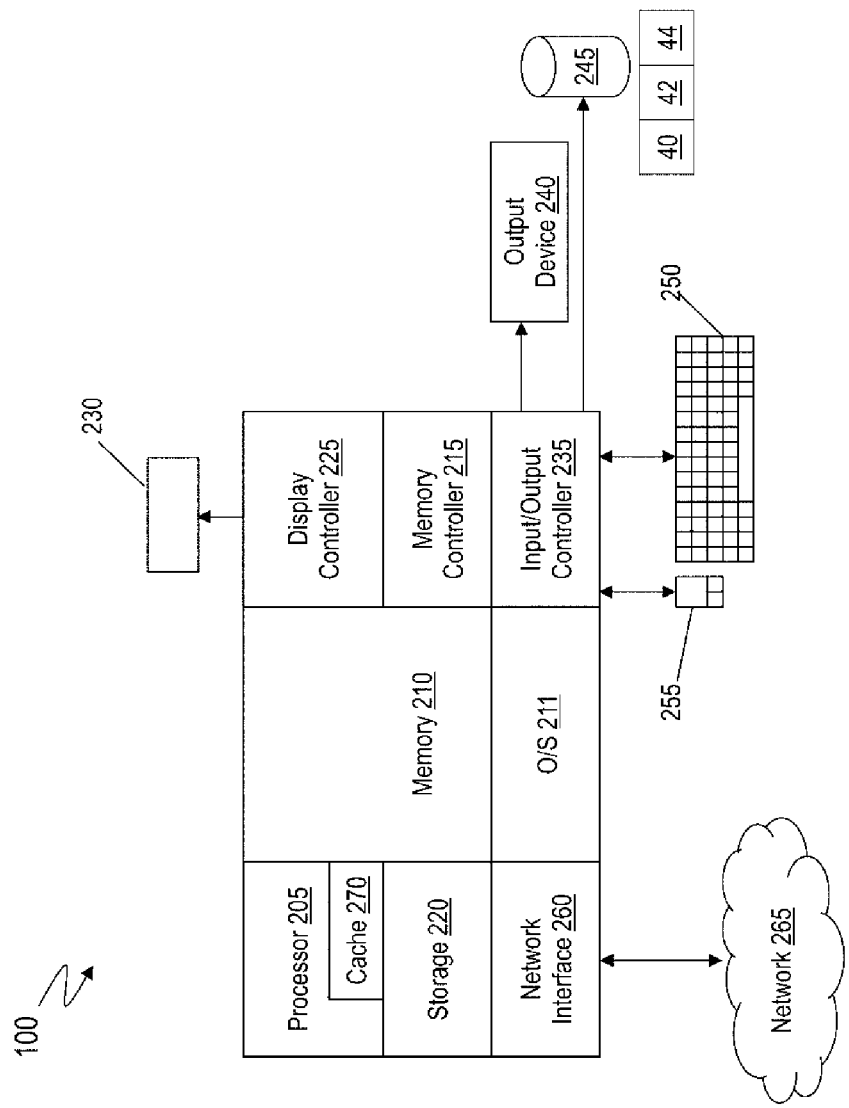
FIG. 2 illustrates an example communication device.

FIG. 2 illustrates an example communication device 100. The communication device 100 may depict the user device 160 and the host system 190 either or both. The communication device 100 may be a communication apparatus, such as a computer. For example, the communication device 100 may be a desktop computer, a tablet computer, a laptop computer, a phone, such as a smartphone, a server computer, or any other device that communicates via a network 265. The communication device 100 includes hardware, such as electronic circuitry.

The communication device 100 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors (gyroscope 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the communication device 100, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The communication device 100 may further include a display controller 225 coupled to a user interface or display 230. In some embodiments, the display 230 may be an LCD screen. In other embodiments, the display 230 may include a plurality of LED status lights. In some embodiments, the communication device 100 may further include a network interface 260 for coupling to a network 265. The network 265 may be an IP-based network for communication between the communication device 100 and an external server, client and the like via a broadband connection. In an embodiment, the network 265 may be a satellite network.

The network 265 transmits and receives data between the communication device 100 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
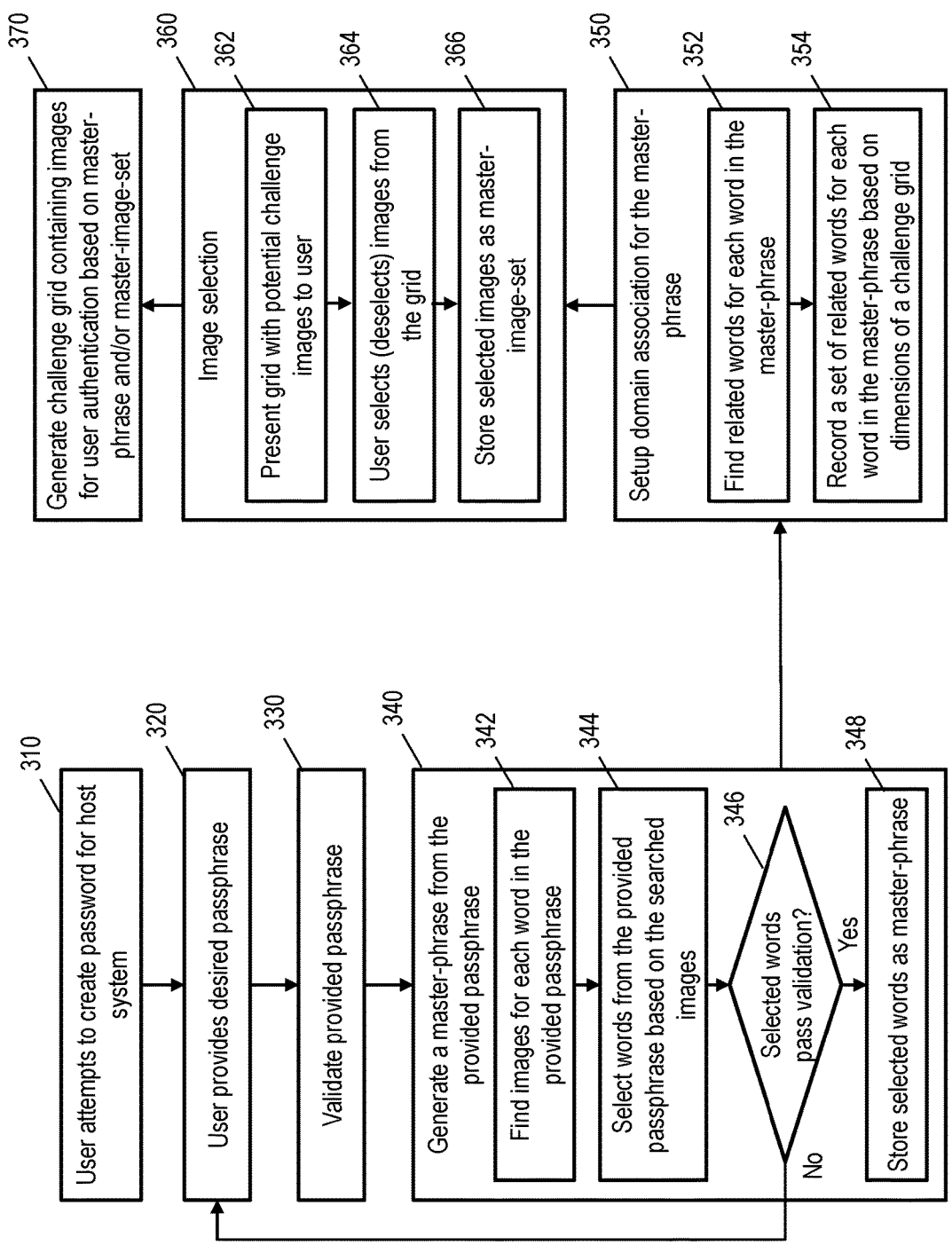
FIG. 3 depicts a flowchart of an example method for image passphrase setup based authentication according to one or more embodiments of the present invention.

FIG. 3 depicts a flowchart of an example method for image passphrase setup based authentication according to one or more embodiments of the present invention. The method includes a user request to create a passphrase for the host system 190 at 310. For example, the passphrase may be created when registering an account or resetting a passphrase for an existing account, for any other such reason. The method includes the user providing the desired passphrase for logging into the host system 190 at 320. The user provides the passphrase via the user device 160, for example by typing, speaking (voice input) or other such I/O techniques or a combination thereof. Consider an example scenario where the provided passphrase is "The impact of a conscious artist is necessary and it ripples through the world."

In one or more examples, the host system 190 validates the provided passphrase, at 330. The validation may include the host system 190 checking that the passphrase has not been used before by the user, checking if the passphrase is too common, checking if the passphrase includes a predetermined number of words and the like.

The method further includes generating a master-phrase using the provided passphrase, at 340. Generating the master-phrase includes finding images for each word in the provided passphrase, at 342. The images are searched from a predetermined database of images, or an image search provider service, or the like. The words from the provided passphrase are used as keywords for performing the search. In one or more examples, synonyms for the words in the provided phrase are first determined and used for finding the images. The synonyms can be determined using an electronic dictionary, electronic thesaurus, or any other such manner. Further, in one or more examples, particular types of words from the provided passphrase are not used for performing the image search in the image databases. For example, articles, conjunction and the like are excluded from the image search.

Further, the host system 190 selects words from the provided passphrase based on the searched images, at 344. In one or more examples, for each word in the provided passphrase, a confidence score is computed, the confidence score of a particular word indicative of whether the images found for that word match a meaning/context of the word in the passphrase. The confidence score can be computed using a third party service, or any other manner that is provided the word and the corresponding images that are searched for that word. The host system 190 selects the words from the provided passphrase that have at least a predetermined threshold confidence score. Alternatively, or in addition, the host system 190 selects at least a predetermined number of words, such as 3, 4, 5, 8, or any other number with the highest confidence score.

The selected words are validated for use in the master-phrase, at 346. The validation includes ensuring that at least a predetermined number of words are selected. Further, the validation can include ensuring that image content for each selected word is available. For example, the availability of the image content can be determined based on a number of representative images associated with the selected word are available in the image search databases being used. In one or more examples, a selected word is deemed to be validated if at least a predetermined number of representative images, say 10, 15, etc., are available in the image search database(s) for the selected word. In one or more examples, if the minimums are not met, the validation fails and the method includes directing the user to submit a different passphrase. If the validation conditions are met, the selected words are saved as the master-phrase, at 348. In one or more examples, the master-phrase is saved associated with the user as part of the access codes 194. For example, in the case of the example provided passphrase, the host system 190 selects and stores, as the master-phrase "impact, conscious, artist, ripples, world."

The method further includes setting a domain association for the master-phrase, at 350. For setting the domain association, the host system 190 identifies related words for each master-phrase word, at 352. The related words are obtained using one or more services such as an electronic dictionary, and the like or a combination thereof. It should be noted that the related-words identified here may be different from the synonyms that are identified when determining the master phrase. For example, for 'artist' the related-words may include 'art, music, jasper johns, photographer, singer, vocalist, musician,' and the like (rather than 'artisan, craftsman, painter' from a typical thesaurus). The host system 190 further records a set of related words containing at least a predetermined number of words to complete a predetermined challenge grid that is used for the user authentication, at 354. For example, if the challenge grid dimensions are 4x4=16, and the master-phrase is 5 words, the host system 190 records at least 11 related words to be used for authentication. The recorded related words in the domain association along with the words stored as part of the master-phrase are used to present the challenge grid to the user for logging in and authentication as described further, at 370. The challenge grid contains images representative of the one or more stored words (master-phrase and related domain words) as will be described further. Table 1 provides example related domain words identified for the master-phrase in the ongoing example.

Figure 4:
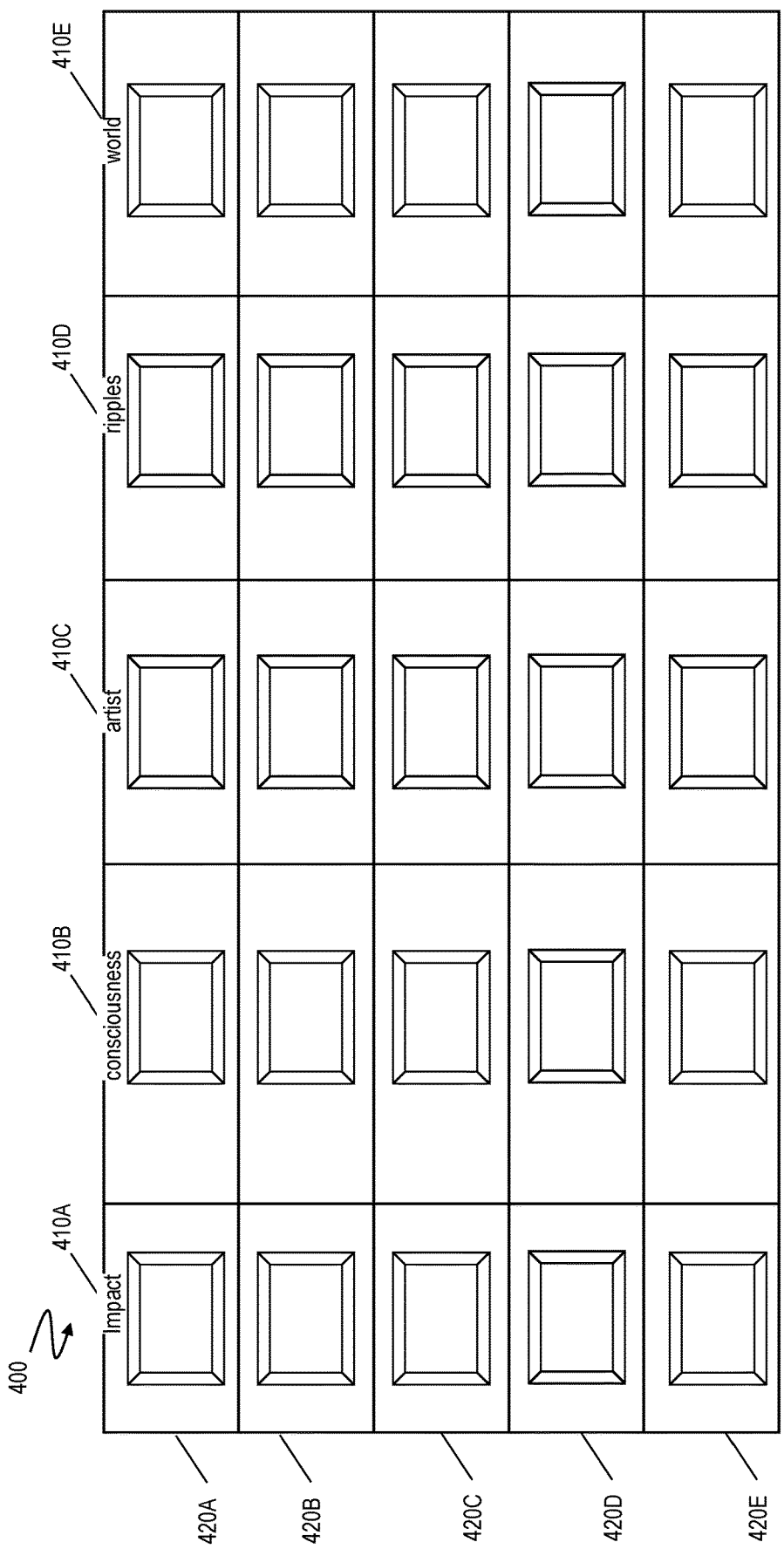
FIG. 4 depicts an image-selection grid according to one or more embodiments of the present invention.

TABLE 1 impact = touch, influence
conscious = awake, aware
artist = musician, photographer
ripples = bubbles, gurgle
world = universe, people In one or more examples, the host system 190 further performs an image selection based on the words in the master-phrase and the related domain words, at 360. FIG. 4 depicts an image-selection grid according to one or more embodiments of the present invention. The image selection includes presenting an image-selection grid 400 containing potential challenge images to the user, at 362. Each column 410A, 410B, 410C, 410D, and 410E in the image-selection grid 400 contains a multitude of images that represent a specific master-phrase word and domain words related to that word. A column 410A-E is associated with a respective word from the master-phrase words. For instance, in the ongoing example, the columns 410A-E are associated with the master-phrase words "impact", "conscious", "artist", "ripples", and "world", respectively. The images 420A-E in the column 410A represents the corresponding master-phrase word (impact) and the related domain words. It should be noted that in other examples the image-selection grid 400 can contain a different number of columns/images than shown in the example of FIG. 5. Further, the images in the depicted image-selection grid 400 are examples and that in other examples different images can be presented.

It should be noted that the description herein uses a 2D grid only for explanation, and that a 'grid' as used herein can be a single-dimension sequence of images, a 2D grid, a 3D grid, or any other dimensioned grid. Further, the dimensions of the grid provided herein are exemplary and that any dimensions may be used. For example, a 2D/3D grid may be asymmetric (dimensions in x, y, and/or z dimensions being different from each other).

Referring to the flowchart of FIG. 4, the image selection further includes receiving, from the user, a selection (or deselection) of one or more images from the image-selection grid 400, at 364. For example, the user can deselect specific images (which the user feels ambiguous, does not prefer, etc.) that the user does not want to be included for the master-phrase word. Alternatively, or in addition, the user can deselect a master-phrase word he/she does not want to be included in passphrase challenges. Deselecting a word deselects an entire column 410A-E from the image-selection grid 400. The host system 190 further saves the set of images that are selected (not deselected) as a master-phrase image set along with the master-phrase word list, at 366. In one or more examples, the host system 190 saves the master-phrase image set upon the user is satisfied with the image sets, and s/he provides a notification indicative of accepting the master-phrase image-set. Alternatively, in one or more examples, the user can request updating one or more images that are searched for the master-phrase and the related domain words. In such a case, the host system 190 presents an updated image-selection grid 400 with different, updated, images for the user to select.

Figure 5:
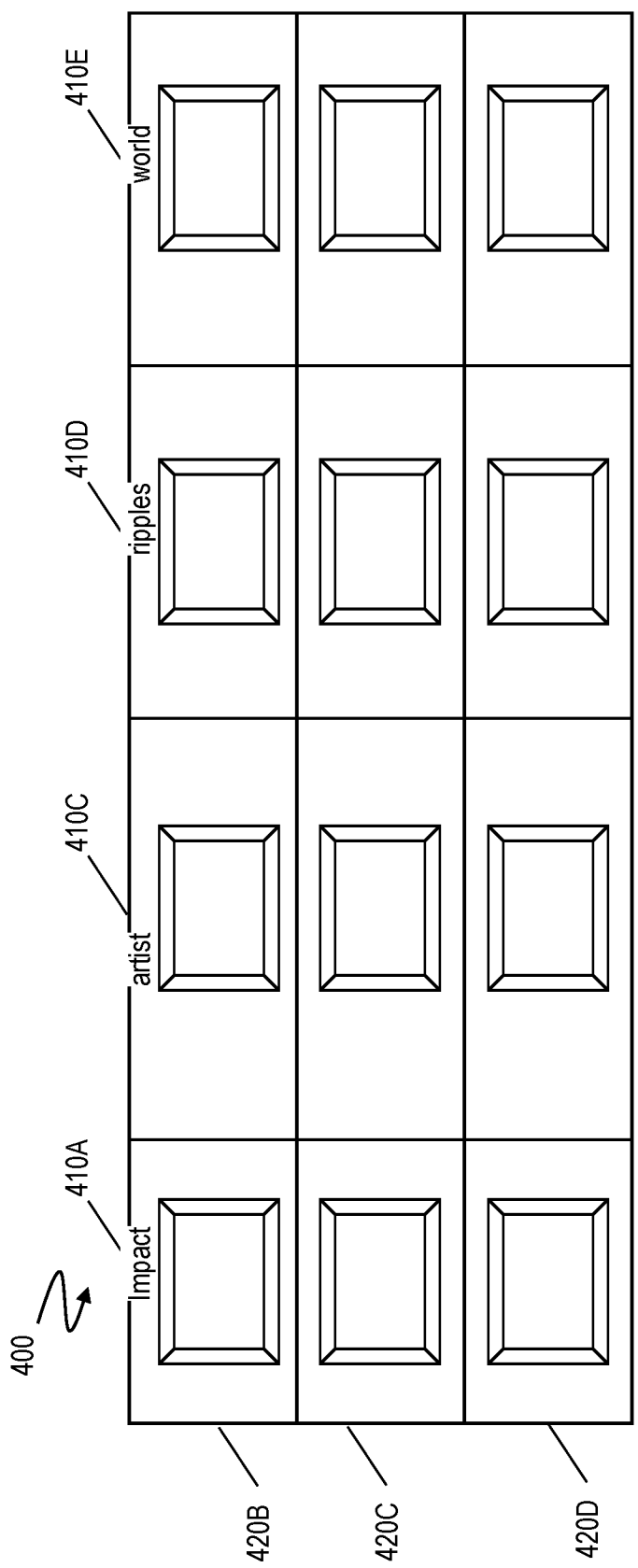
FIG. 5 depicts an updated image-selection grid with the selected images in an ongoing example pass-phrase.

FIG. 5 depicts an updated image-selection grid 400 with the selected images in the ongoing example pass-phrase. As depicted, the user deselected various images (e.g. 420A, 420E) and also a column 410B to update the master phrase-list and the corresponding master-phrase image set. In one or more examples, the number of images selected (or deselected) from each column can be different. The reduced or simplified passphrase that the user may now remember is represented by the words with a '*' from the originally provided passphrase: "impact* of an artist* sends ripples* through the world*."

The master-phrase image set is used to present the challenge grid to the user for logging in and authentication as described further, at 370. If this is the first time the user is registering on the host system 190 the master-phrase image set and the master-phrase word list are stored in the access codes 194 for the user's account. Alternatively, if the user is resetting/updating his/her authentication passphrase, a previous master-phrase image set and a master-phrase word list of the user's account are replaced with those generated.

Accordingly, the host system 190 does not record/store the actual passphrase that the user submitted and stores the master-phrase word list and a corresponding master-phrase image-set that are used for user authentication.

Figure 6:
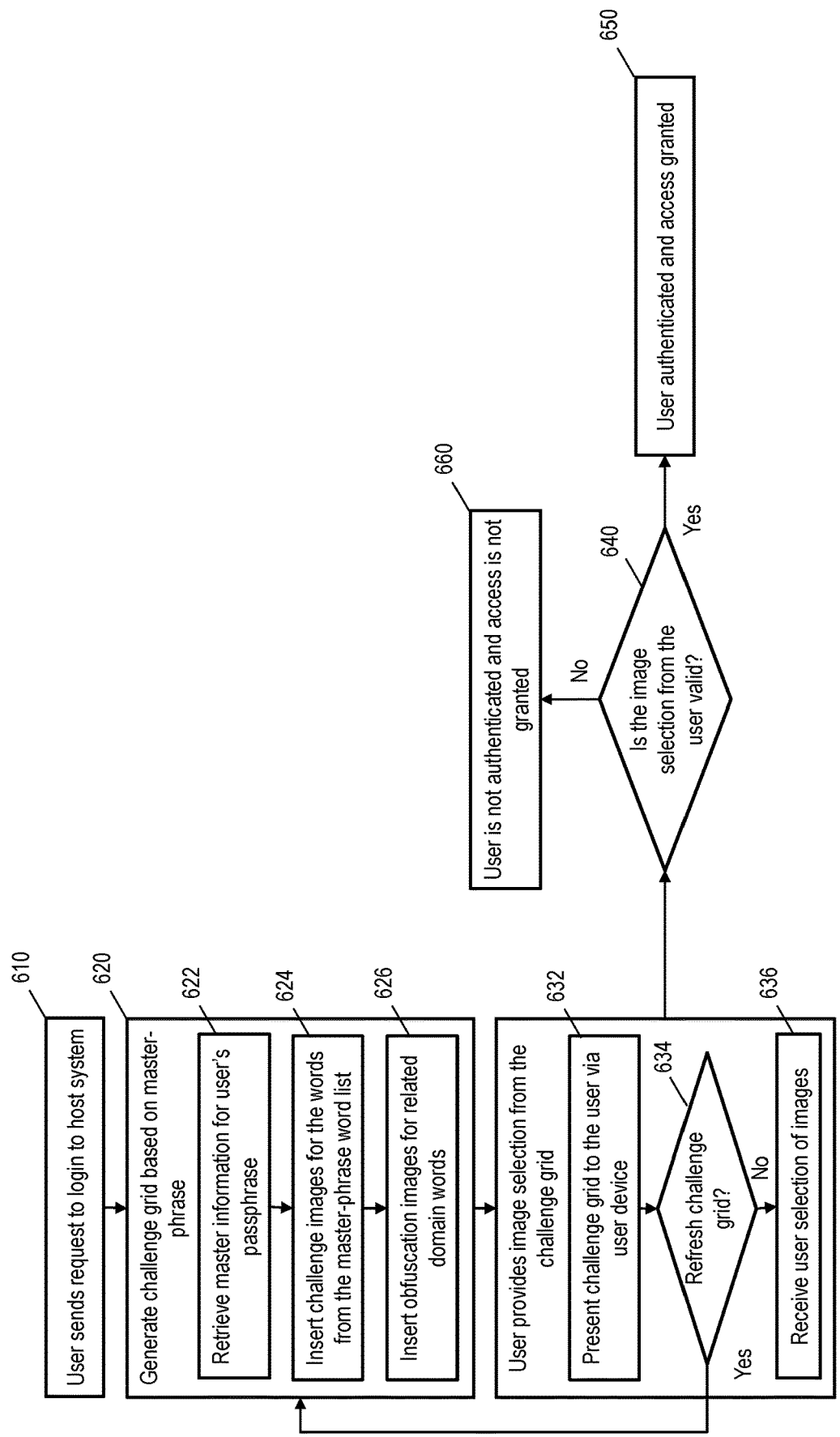
FIG. 6 depicts a flowchart for a method to access the host system using the image-based authentication according to one or more embodiments of the present invention.

FIG. 6 depicts a flowchart for a method to access the host system using the image-based authentication according to one or more embodiments of the present invention. The method includes the user sending a request to access the host system 190 at 610. The user sends the request via the user device 160. The request includes a login request. The host system 190 dynamically generates a challenge grid for authenticating the user, at 620.

Figure 7:
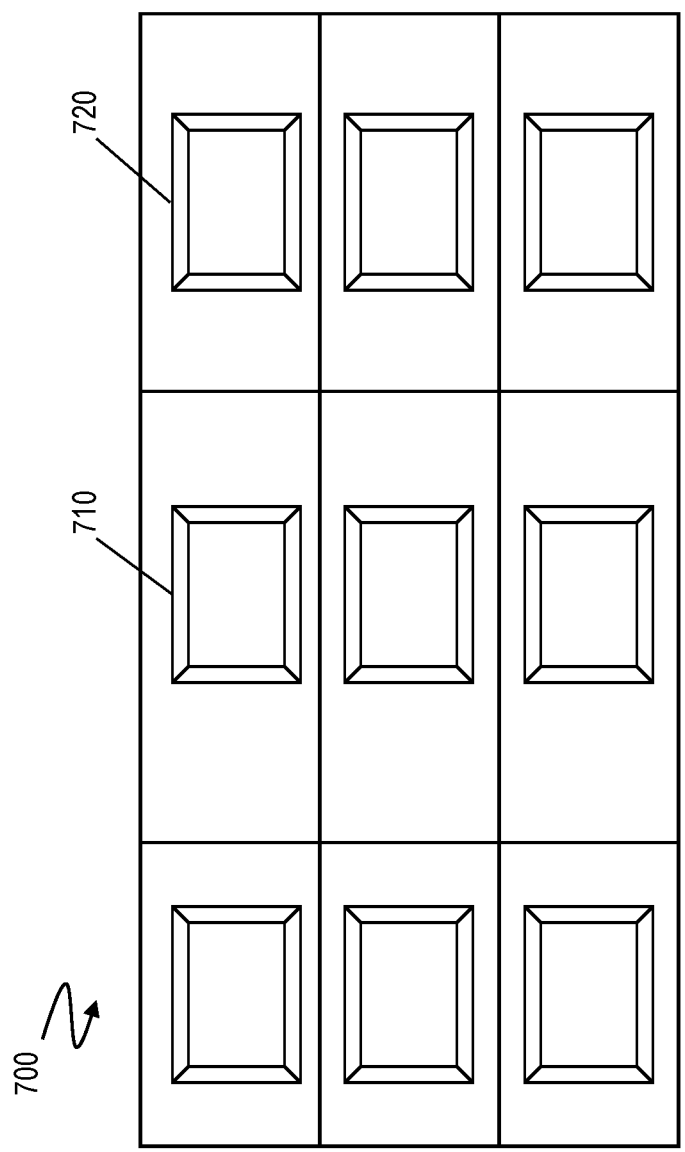
FIG. 7 depicts an example challenge grid that is generated by a host system according to one or more embodiments of the present invention.

FIG. 7 depicts an example challenge grid that is generated by the host system 190 according to one or more embodiments of the present invention. The challenge grid 700 has predetermined dimensions, such as 3×3, 4×4, 4×3, or the like, each slot in the challenge grid containing an image. The challenge grid 700 includes challenge images 710 that represent the master-phrase words, each master-phrase word being represented. The challenge image representing the master-phrase word is randomly selected from the image database or from the master-phrase image-set, if one exists. The challenge grid 700 further includes obfuscation images 720 representing one or more domain-associated words. Insertion of related domain obfuscation images 720 is for obfuscation of the challenge images 710. The challenge images 710 and the obfuscation images 720 are placed in the challenge grid 700 in a random manner. In one or more examples, the challenge grid 700 can randomly or occasionally omit a challenge image 710 representing one or more master-phrase words, as a negative challenge.

Generating the challenge grid includes retrieving the passphrase master information for the user's account, which can be determined based on a username, biometric, or any other kind of identification that the user provides as part of the login request, at 622. The retrieved master information includes the master-phrase word list and related domain words. In one or more examples, if the user has created a master-phrase image-set (by deselecting/selecting images), the master-phrase image-set is also retrieved.

Figure 8:
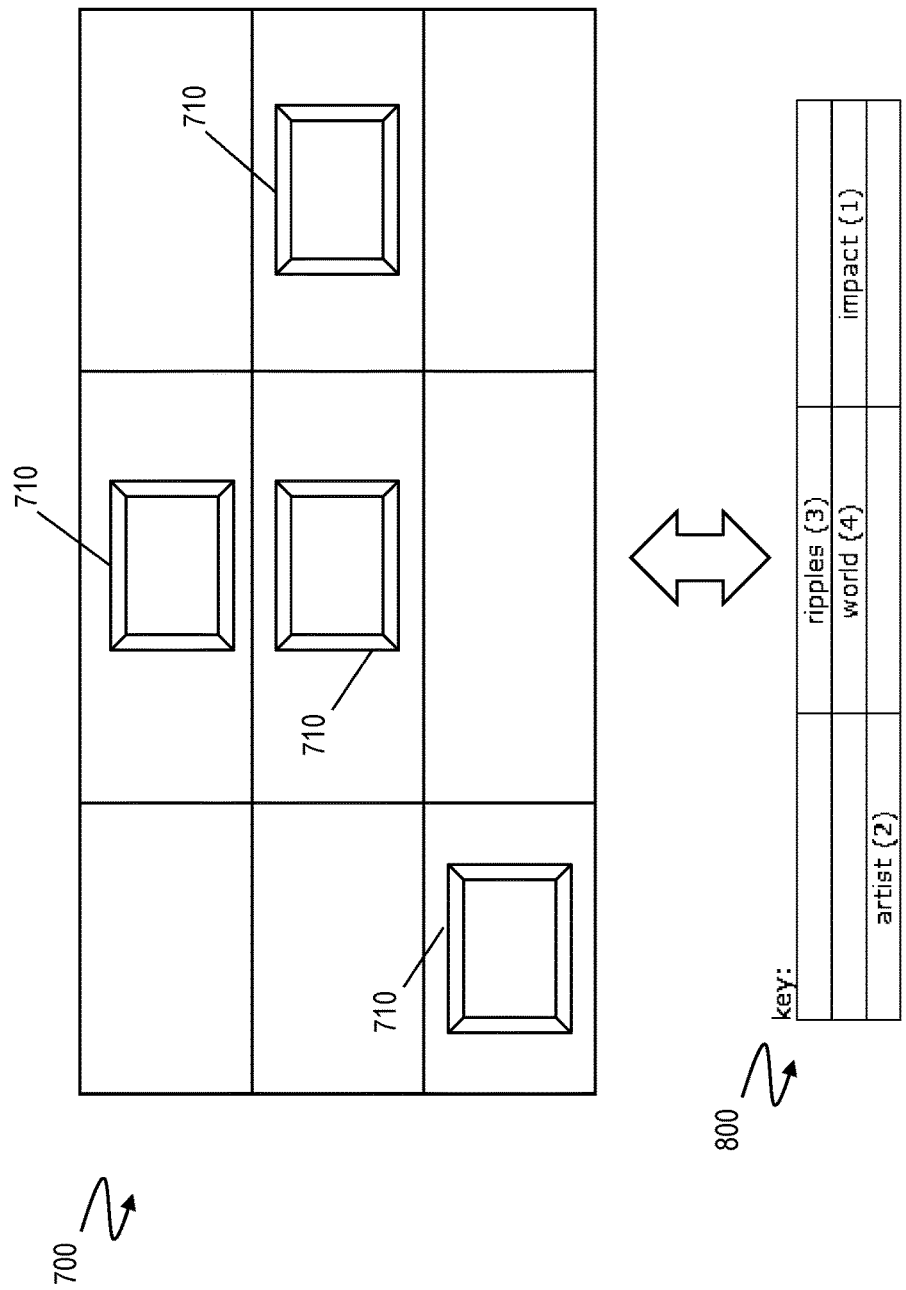
FIG. 8 depicts an example intermediate stage during the creation of a challenge grid for an ongoing example.

Further, the host system 190 builds the challenge grid 700 in memory by inserting one image for each of the words from the master-phrase word list, at 624. In one or more examples, a word is selected at random from the master-phrase word list and a corresponding challenge image 710 is selected and inserted in the challenge grid 700. The selected challenge image 710 is designated a random slot in the challenge grid 700. FIG. 8 depicts an example intermediate stage during the creation of the challenge grid 700 for the ongoing example, where a key 800 for the selected challenge images 710 is shown. The master-phrase words (impact, artist, ripples, world) corresponding to the challenge images 710 in the challenge grid 700 are depicted in the key 800 at corresponding positions of the challenge grid 700.

Figure 9:
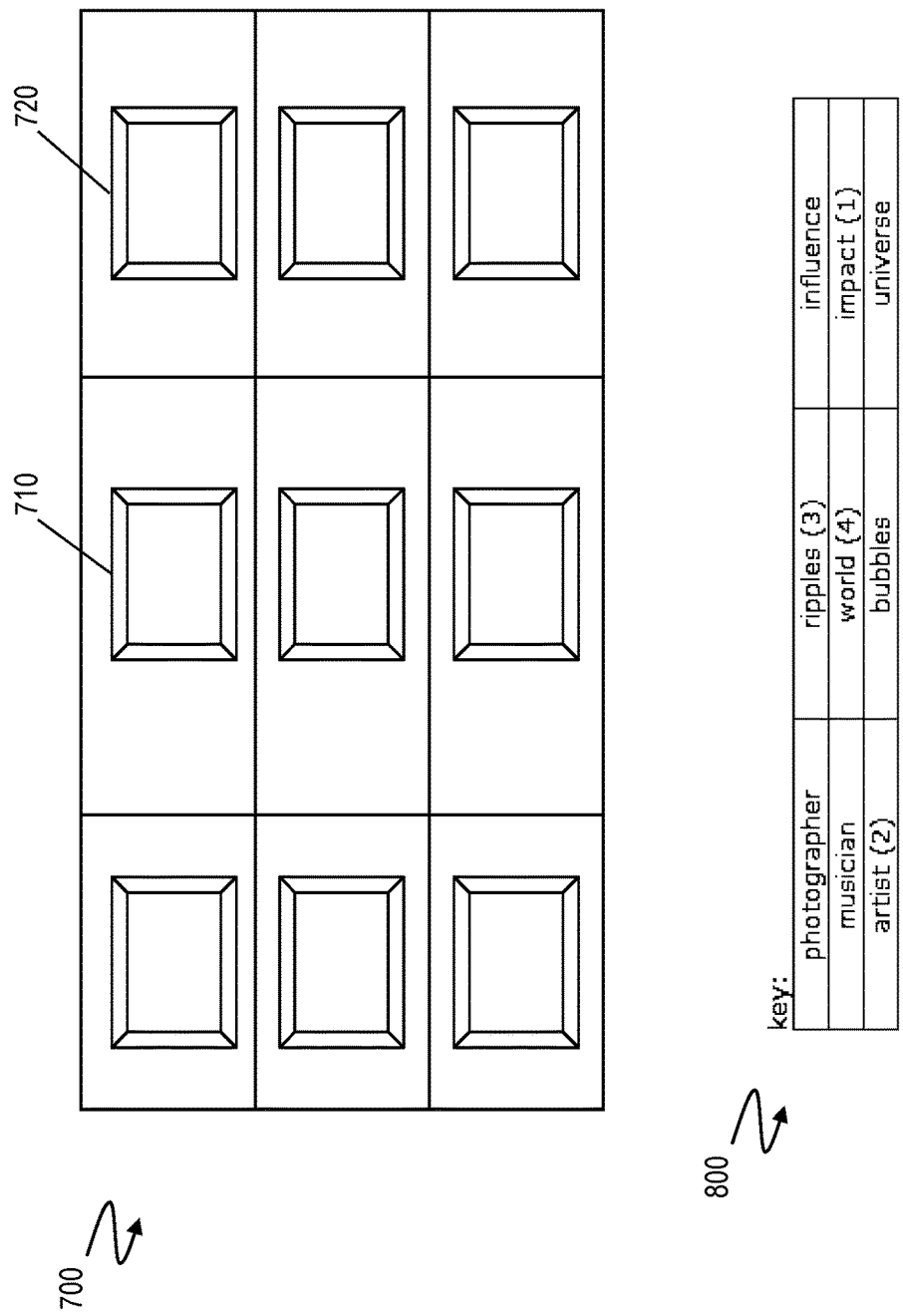
FIG. 9 depicts a challenge grid and a corresponding key, which includes randomly selected related domain words.

The host system 190 further inserts additional obfuscation images 720 in the challenge grid 700 based on the domain-related words, at 626. The host system 190 selects randomly one or more of the related domain words corresponding to slots in the challenge grid 700 that are not assigned a challenge image 710. The host system 190 searches for an obfuscation image 720 for each of the selected related domain words and assigns the obfuscation image 720 to one of the empty slots. FIG. 9 depicts the challenge grid 700 and the corresponding key 800, which now includes the randomly selected related domain words.

The method further includes the user providing image selection from the challenge grid 700 to the host system 190 at 630. The host system 190 provides the challenge grid 700 for display to the user via the user device 160, at 632. The user remembers the passphrase and looks for matching images in the challenge grid 700. In one or more examples, the user can refresh the page and see a new set of random challenge images 710 and obfuscation images 720, if the presently provided images in the challenge grid 700 is unclear or confusing. Alternatively, or in addition, the user can request a refresh in case of a negative challenge presented by the host system 190 where challenge images 710 for all the words from the master-phrase word list are not added to the challenge grid 700. Accordingly, if the user requests a refreshed challenge grid 700 in such cases, the host system regenerates the challenge grid 700, at 634 and 620. Alternatively, the host system 190 receives the user's selection of images from the challenge grid 700, at 636. The user can select one or more images from the challenge grid 700 by clicking, touching, or by any other user-interface gesture.

The host system 190 determines if the user recognizes and selects the challenge images 710 representing the master-phrase, at 640. In one or more examples, the determination also includes if the challenge images are selected in the correct order, as in the order of the words in the master-phrase (e.g. impact-artist-ripples-world). If the selected images match, that is it includes, only the challenge images 710 the user is authenticated and granted access to the host system 190 at 650. If the image selection from the challenge grid 700 is invalid, that is, the selection does not match the challenge images 710, the user is not authenticated and access is not granted, at 660. For example, the user can select one or more obfuscation images 720 making the image selection invalid and unauthenticated. In such cases, the user may be asked for repeating the login process with a refreshed challenge grid 700. Alternatively, or in addition, the user can be provided an option to reset the passphrase using the method described earlier. In one or more examples, the number of login attempts by the user is limited to a predetermined threshold number, such as 3, 5, and the like.

Accordingly, the technical solutions described herein facilitates a user-intuitive and secure use login/authentication in an image-based manner and without the user having to type or provide the desired passphrase that the user had originally entered. The technical solutions described herein facilitate generating a set of challenge images to represent the desired passphrase. In one or more examples, the challenge images are variable (not fixed). In one or more examples, a master-phrase image-set is generated to select the challenge images from. Further, the technical solutions facilitate insertion of related domain images for obfuscation of the challenge images. The related domain images are variable (not fixed). In one or more examples, the user does not have to select or approve images used to represent a pass-phrase (full decoupling). Accordingly, the technical solutions described herein facilitate that the actual passphrase that the user submitted is not recorded by the host system, and in its place, a master-phrase word list and a master-phrase image-set is stored.

The technical solutions described herein are rooted in computer technology for authenticating/validating/verifying a user's request to login to a host system and provides an improvement to computer technology by providing a more secure and more user-intuitive login than typical login techniques. The technical solutions facilitate the passphrase sentence to be easier for a user to remember than a password and further facilitates that the user does not have to type or enter the selected passphrase sentence directly in any manner at subsequent logins, rather the user selects a series of images instead of typing the passphrase sentence. Further, the technical solutions described herein works with a selection of images on a screen, making the login technique mobile and accessibility friendly, without requiring a keyboard. The login techniques provided by the technical solutions described herein makes the user authentication data more secure than typical passphrase storage and comparison techniques, in turn making the user authentication hard to hack or spoof, because human recognition of images and context/meaning of the images is required. Further, the login technique provided herein is secure, and hard to hack or spoof, because random images are inserted for user selection, and the image set is non-reproducible. For example, in the case where images are frequently randomized and drawn from an ever-changing body of images (e.g. the Internet) a set of images can be presented to the user during a challenge that cannot be reproduced again because of randomization. This increases security of the technical solutions described herein.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for image-based user authentication, the method comprising:
   receiving, by a host system, a request for authentication of a user;
   retrieving, by the host system, a passphrase that is stored for authenticating the user;
   generating, by the host system, an image selection grid comprising a set of images, wherein each image from the set of images corresponds to a respective word from the passphrase, wherein selecting the set of images for the image selection grid comprises:
      searching for an image for a word from the passphrase;
      computing a confidence score for the image, the confidence score represents whether the image corresponding to said word matches a context of said word in the passphrase; and
      selecting the image for the image selection grid in response to the confidence score being above a predetermined threshold;
   receiving, by a host system, a selection of images from the image selection grid from the user;
   presenting, by the host system, the image selection grid to the user;
   receiving, by the host system, a plurality of selected images from the image selection grid; and
   authenticating, by the host system, the user based on the selected images.

2. The method of claim 1, wherein a sequence of the selection of images from the image selection grid is recorded.

3. The method of claim 2, wherein the user is authenticated if the sequence of the selection of images is in a predetermined sequence.

4. The method of claim 1, wherein the image selection grid further comprises a plurality of obfuscation images.

5. The method of claim 1, wherein the images from the set of images are placed in the image selection grid at random positions.

6. The method of claim 1, wherein the image selection grid has predetermined dimensions.

7. A system comprising:
   a memory; and
   a processor coupled with the memory, the processor configured to perform an image-based user authentication that comprises:
      receiving, by a host system, a request for authentication of a user;
      retrieving a passphrase that is stored for authenticating the user;
      generating an image selection grid comprising a set of images, wherein each image from the set of images corresponds to a respective word from the passphrase, wherein selecting the set of images for the image selection grid comprises:
         searching for an image for a word from the passphrase;
         computing a confidence score for the image, the confidence score represents whether the image corresponding to said word matches a context of said word in the passphrase; and
         selecting the image for the image selection grid in response to the confidence score being above a predetermined threshold;

receiving a selection of images from the image selection grid from the user;

presenting the image selection grid to the user;

receiving a plurality of selected images from the image selection grid; and authenticating the user based on the selected images.

8. The system of claim 7, wherein a sequence of the selection of images from the image selection grid is recorded.

9. The system of claim 8, wherein the user is authenticated if the sequence of the selection of images is in a predetermined sequence.

10. The system of claim 7, wherein the image selection grid further comprises a plurality of obfuscation images.

11. The system of claim 7, wherein the images from the set of images are placed in the image selection grid at random positions.

12. The system of claim 7, wherein the image selection grid has predetermined dimensions.

13. A computer program product comprising a computer readable storage medium having program instructions embodied therewith, the program instructions executable by an electronic computer processor to perform an image-based user authentication that comprises:

receiving, by a host system, a request for authentication of a user;

retrieving a passphrase that is stored for authenticating the user;

generating an image selection grid comprising a set of images, wherein each image from the set of images corresponds to a respective word from the passphrase, wherein selecting the set of images for the image selection grid comprises:

searching for an image for a word from the passphrase;

computing a confidence score for the image, the confidence score represents whether the image corresponding to said word matches a context of said word in the passphrase; and selecting the image for the image selection grid in response to the confidence score being above a predetermined threshold;

receiving a selection of images from the image selection grid from the user;

presenting the image selection grid to the user;

receiving a plurality of selected images from the image selection grid; and authenticating the user based on the selected images.

14. The computer program product of claim 13, wherein a sequence of the selection of images from the image selection grid is recorded.

15. The computer program product of claim 14, wherein the user is authenticated if the sequence of the selection of images is in a predetermined sequence.

16. The computer program product of claim 13, wherein the image selection grid further comprises a plurality of obfuscation images.

17. The computer program product of claim 13, wherein the images from the set of images are placed in the image selection grid at random positions.

18. The computer program product of claim 13, wherein the image selection grid has predetermined dimensions.

* * * * *